Nov. 17, 1959 A. MAUSER 2,913,039
SEAT MOUNTING DEVICE
Filed Feb. 28, 1957 9 Sheets-Sheet 1

INVENTOR
ALFONS MAUSER

Nov. 17, 1959  A. MAUSER  2,913,039
SEAT MOUNTING DEVICE
Filed Feb. 28, 1957  9 Sheets-Sheet 2
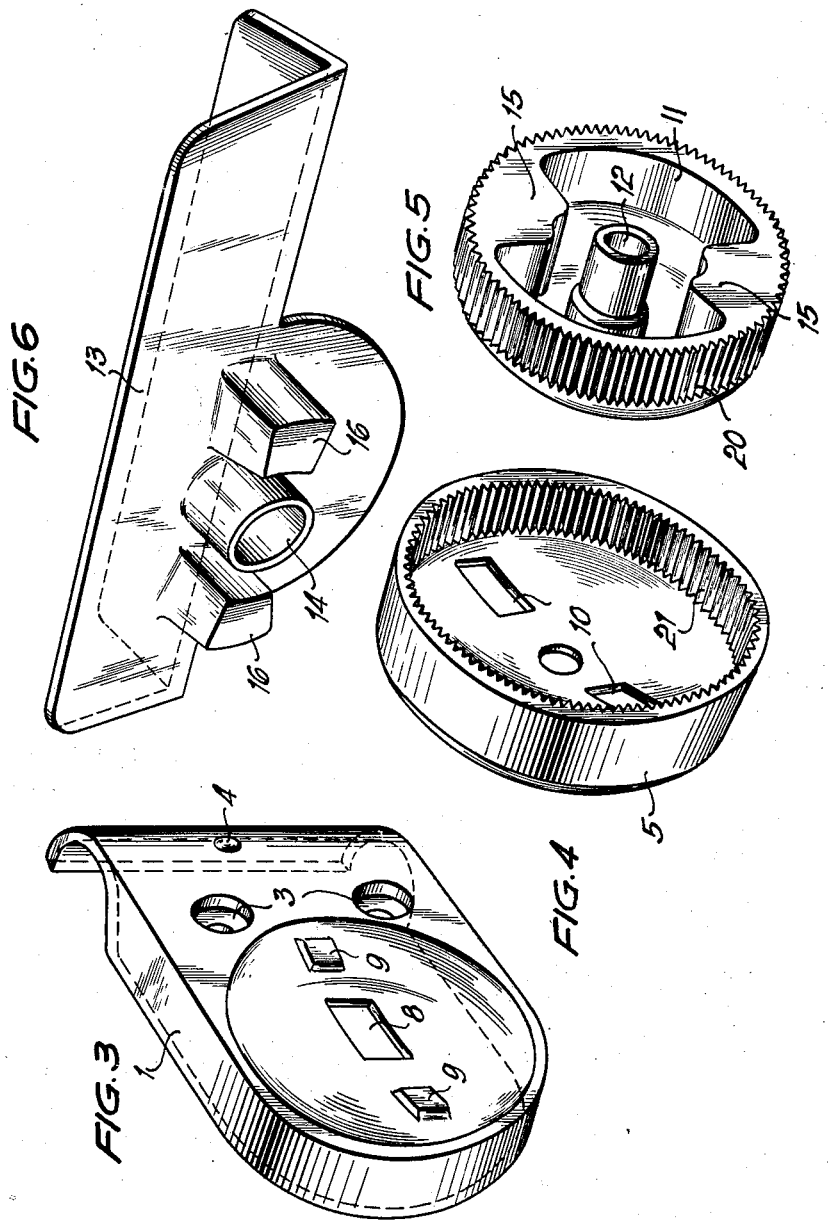
INVENTOR
ALFONS MAUSER Nov. 17, 1959 A. MAUSER 2,913,039
SEAT MOUNTING DEVICE Filed Feb. 28, 1957 9 Sheets-Sheet 3

INVENTOR
ALFONS MAUSER
BY

Nov. 17, 1959    A. MAUSER    2,913,039
SEAT MOUNTING DEVICE
Filed Feb. 28, 1957    9 Sheets-Sheet 4

INVENTOR
ALFONS MAUSER
BY

Nov. 17, 1959  A. MAUSER  2,913,039
SEAT MOUNTING DEVICE
Filed Feb. 28, 1957  9 Sheets-Sheet 5

INVENTOR
ALFONS MAUSER

Nov. 17, 1959  A. MAUSER  2,913,039
SEAT MOUNTING DEVICE
Filed Feb. 28, 1957  9 Sheets-Sheet 6
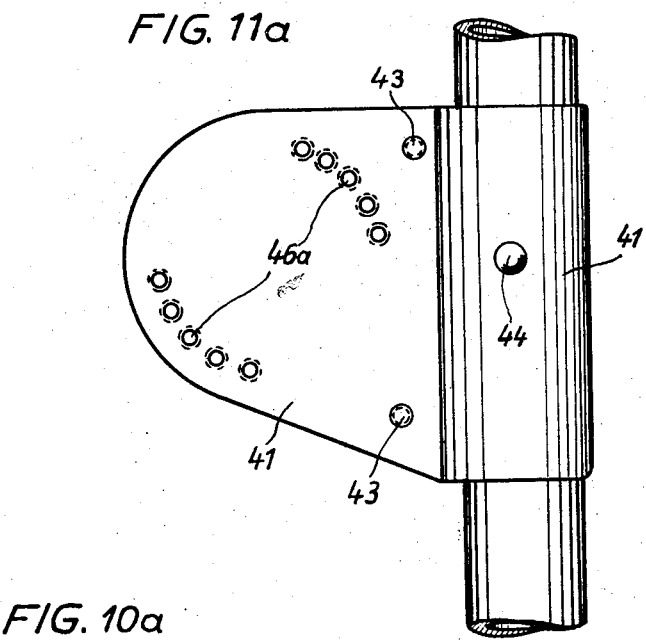
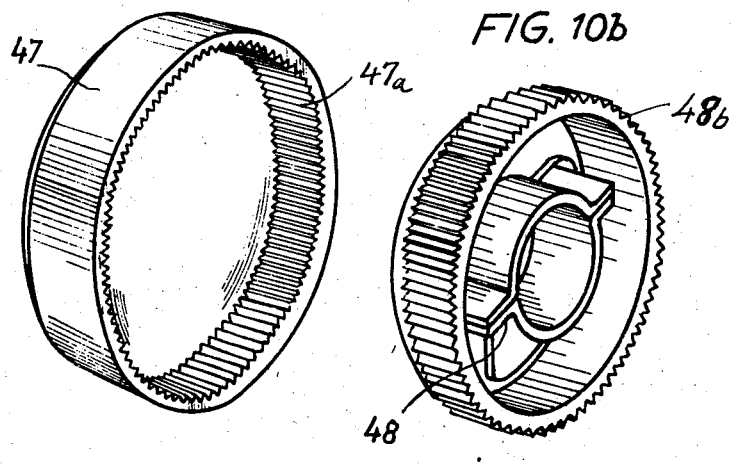
INVENTOR:
ALFONS MAUSER Nov. 17, 1959 — A. MAUSER — 2,913,039
SEAT MOUNTING DEVICE
Filed Feb. 28, 1957 — 9 Sheets-Sheet 7

INVENTOR
ALFONS MAUSER

Nov. 17, 1959   A. MAUSER   2,913,039
SEAT MOUNTING DEVICE
Filed Feb. 28, 1957   9 Sheets-Sheet 8

INVENTOR:
ALFONS MAUSER

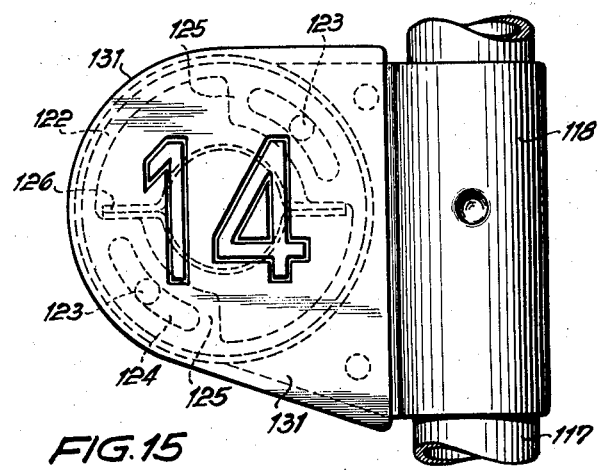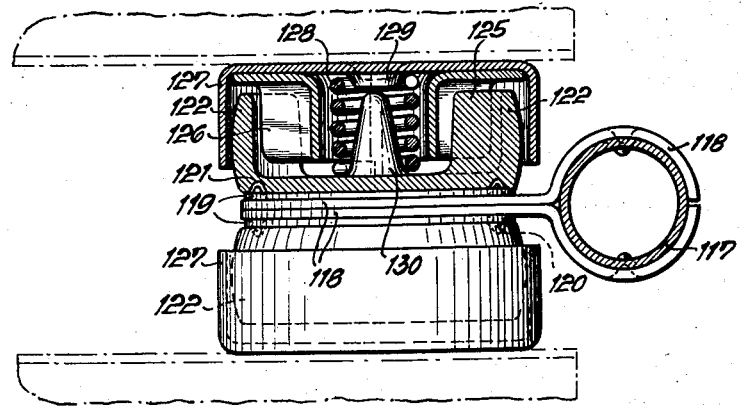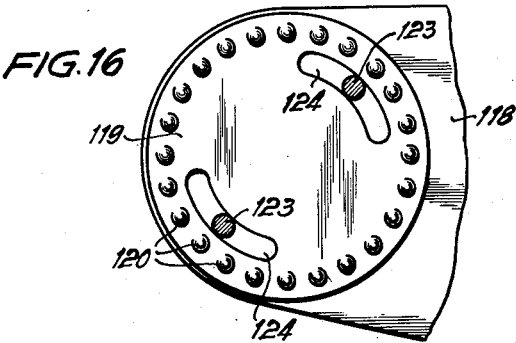

United States Patent Office 2,913,039
Patented Nov. 17, 1959

2,913,039

SEAT MOUNTING DEVICE

Alfons Mauser, Koln-Ehrenfeld, Germany, assignor to Firma Mauser, Kommanditgesellschaft, Koln-Ehrenfeld, Germany Application February 28, 1957, Serial No. 643,060

Claims priority, application Germany March 3, 1956

19 Claims. (Cl. 155—86)

The present invention relates to seat mounting devices and more particularly to devices for mounting seats in side-by-side relation.

For example, the present invention is applicable to rows of seats used in theatres, stadiums, auditoriums and the like, these rows being straight, arcuate, or angular.

Seats of the above type are conventionally turnable from rest positions where the seats extend substantially vertically to operative positions where the seats extend substantially horizontally, and where such seats are arranged in arcuate or angular rows considerable difficulty is encountered in the provision of satisfactory bearings to support the seats for turning movement because of the fact that such bearings must not only support the seats for turning movement between their operative and rest positions but must, in addition, arrange the seats at predetermined angles with respect to each other so as to locate the seats along an angular or arcuate row. In order to keep the cost low, such bearings are not constructed to compensate for inevitable inaccuracies in the parts which make up a row of seats, and as a result it frequently happens that the seats do not turn through the desired angles, easily become jammed, and are not properly positioned with respect to each other.

One of the objects of the present invention is to provide means overcoming the foregoing disadvantages at a relatively low cost.

Another object of the present invention is to provide means capable of adjustably supporting seats for turning movement about substantially vertical and horizontal axes, so that the positions of the seats with respect to each other can easily be regulated.

A further object of the present invention is to provide means capable of regulating the angle through which a seat turns between its rest and operative positions.

An additional object of the present invention is to provide means accomplishing the above objects with simple and ruggedly constructed elements which are very reliable in operation.

A further object of the invention resides in the provision of means conducive to a very efficacious seat bearing or mounting structure in which the axle or shaft portion forms an integral part of the bearing member and not of the insert for the latter, so that said shaft portion consists of the same material as the bearing member and will not be subject to breakage.

Still another object of the invention is to provide means affording the construction of stop or abutment means used in connection with the bearing means, from yieldable or noise-dampening materials, so that the new seat mounting means will comply with all requirements of the practice.

The above and other objects of the invention will become further apparent from the following detailed description, reference being made to the accompanying drawings, showing preferred embodiments of the invention.

In the drawings:

Fig. 3 is a perspective view of a stationary bearing member shown in the device of Figs. 1 and 2;

Fig. 4 is a perspective view of a movable bearing member shown in the device of Figs. 1 and 2;

Fig. 5 is a perspective view of an insert of the device shown in Figs. 1 and 2;

Fig. 6 is a perspective view of a seat carrying member shown in the device of Figs. 1 and 2;

Fig. 10a is a perspective view of a modified form of movable bearing member pursuant to the device illustrated in Fig. 10;

Fig. 10b is a perspective view of a modified form of insert pursuant to the device illustrated in Fig. 10;

Fig. 11a is an elevational view similar to Fig. 11 and illustrates a modification;

Fig. 15 is a partly sectional plan view of a still further embodiment of the present invention;

Fig. 16 is a partly sectional, fragmentary, elevational view of an adjusting means cooperating with a stationary bearing member shown in the device of Fig. 16; and Fig. 17 is an elevational view of a cap used in connection with a device of the invention forming the end device of a row of such devices.

Figure 2:
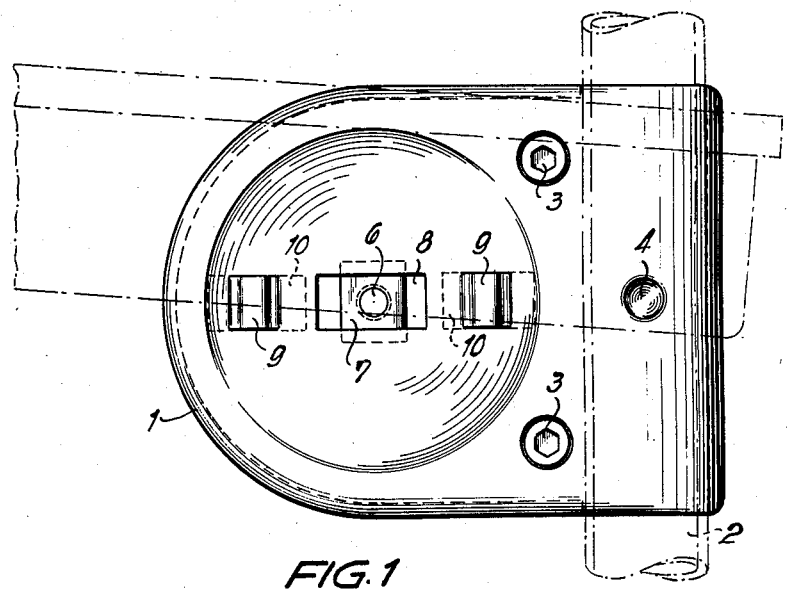
Fig. 2 is an elevational view of the structure of Fig. 1 showing one of the stationary bearing members thereof.
Figure 1:
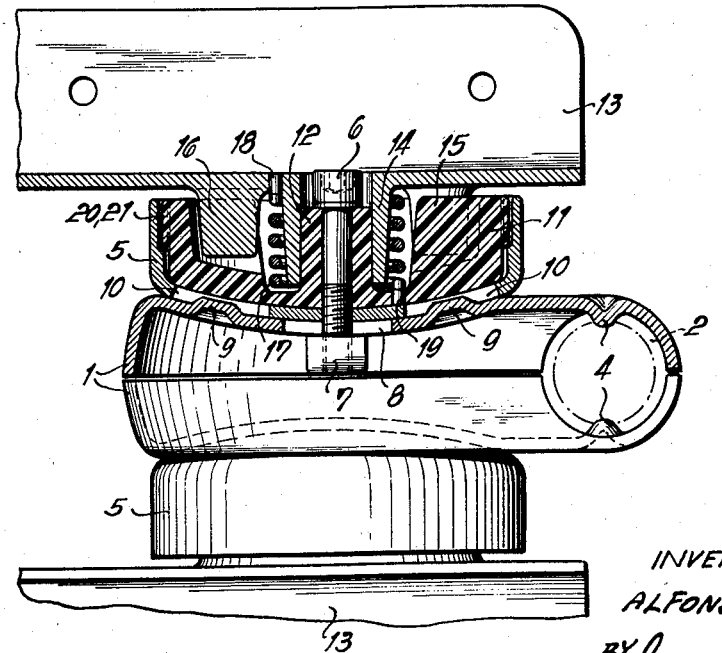
Fig. 1 is a partly sectional plan view of one of many possible embodiments of a device according to the present invention for mounting a pair of seats in side-by-side relation.

Referring now to Figs. 1 and 2, it will be seen that the structure of the invention includes a hollow tubular rigid bar 2 adapted to be fixed to and extend upwardly from a floor. A pair of stationary bearing means are fixed to each other and to the bar 2, and each of these stationary bearing means takes the form of a stationary bearing member 1 having an outer concave bearing surface, each bearing member 1 being made, for example, of a suitable rigid metal.

The bearing members 1 are identical and are drawn together by screws 3 connected thereto and having their ends countersunk in one of the bearing members 1, as shown in Fig. 2. At their right ends as viewed in Fig. 1, the respective stationary bearing members 1 have clamping portions which together embrace and are drawn against the bar 2 by the screws 3. The bar 2 has a pair of opposite wall portions each formed with openings into which complementary projections 4 extend, these projections 4 being fixed to the stationary bearing members 1 and being in the form of relatively small bulging portions thereof, as indicated in Fig. 1. Thus, as may be seen from Fig. 1, the pair of stationary bearing members 1 each have outwardly directed concave bearing surfaces directed away from each other.

A pair of seat carrying members 13 are respectively located adjacent the stationary bearing members 1 and the bar 2, each seat carrying member 13 having substantially the configuration of an elongated angle iron adapted to be fixed to the lower side edge portion of a seat.

A pair of movable bearing means are each secured to the seat carrying members 13 and the pair of movable bearing means cooperate with the pair of stationary bearing means to connect the seat carrying members 13 to the bar 2 and to support each seat carrying member 13 for turning movement about substantially vertical and horizontal axes.

In the embodiment of Fig. 1 the movable bearing means includes a hollow, dished, movable bearing member 5, and these bearing members 5 each have outer convex surfaces engaging and slidable with respect to the concave surfaces of the bearing members 1.

A guide means is provided for guiding the movable bearing members 5 for turning movement with respect to the associated stationary bearing members 1 about substantially vertical axes while preventing turning of the bearing members 5 about a horizontal axis, and this guide means includes a pair of elongated cutouts 10 formed in each bearing member 5 and a pair of bulging projecting portions 9 forming part of each bearing member 1, these bulging portions 9 extending into the associated cutouts 10, so as to guide the bearing member 5 for turning movement, about vertical axes, while preventing turning movement of the bearing member 5 about a horizontal axis.

Each bearing member 1 is formed with an elongated cutout 8 located between its bulging portions 9.

Each movable bearing means further includes an insert 11 located in each hollow bearing member 5, these inserts 11 being formed of relatively hard noise-reducing materials, the inserts 11 being formed by compressing a non-metallic material at considerable pressure. Each insert 11 has a central axially bored shaft portion 12 which has its axis extending substantially horizontally, and each seat carrying member 13 has integral therewith a rigid hollow tubular portion 14 which has a cylindrical interior slidably receiving the shaft portion 12, so that in this way the seat carrying members 13 are supported by the movable bearing means for turning movement about substantially horizontal axes, respectively.

A bolt 6 has its head end located in each tubular portion 14 so as to be accessible through the seat carrying member 13, and the bolts 6 extend through the associated shaft portions 12, through central openings of the bearing members 5, and through the cutouts 8, respectively, into the stationary bearing members 1. Nuts 7, each located in the stationary bearing members 1, are threaded onto the associated bolts 6, these nuts 7 being wider than the cutouts 8, except for reduced end portions of the nuts 7 which extend slidably into the associated cutouts 8, so that the nuts 7 are shiftable along the associated cutouts 8 but cannot pass therethrough. Thus, the bolts 6 may be turned so as to tightly fix each insert 11, bearing member 5, and bearing member 1 together.

Upon loosening of the bolt 6 is is possible to angularly shift each bearing member 5 together with the insert 11 therein and the seat carrying member 13 connected to the latter about a vertical axis, and then the bolt 6 may be tightened to fix the assembly in this adjusted angular position. In this way the pair of seat carrying member 13 may be angularly adjusted with respect to each other about vertical axes, so that the seats can be arranged along a row of any configuration.

The seat carrying members 13 together with the seats fixed thereto are turned upwardly to rest positions and downwardly to operating positions, and a spring means is provided for urging each seat carrying member 13 to its rest position. As may be seen in Fig. 1 this spring means takes the form of a coil spring 17 coiled about the hollow tubular portion 14, having one end 19 fixed to the insert 11 as by extending into an opening thereof, and having an opposite end 18 fixed to the seat carrying member 13, as by extending into an opening thereof. This spring 17 is tensioned so as to turn the seat member 13 about the shaft portion 12 up to a rest position.

The movable bearing means and the seat carrying member 13 cooperating therewith are provided with a stop means for limiting the turning angle of the seat carrying member 13 about the horizontal axis formed by the shaft portion 12 and this stop means includes a pair of substantially opposed stop members 15 integral with the insert 11 and a pair of cooperating members 16 integral with the seat carrying member 13.

The stop members 16 turn with the seat carrying members 13 and engage the associated stop members 15 in the two end positions of the seat carrying members 13.

The stationary bearing means 1 is shown in perspective view in Fig. 3, while the movable bearing member 5 is shown in perspective view in Fig. 4, the insert 11 is shown in perspective view in Fig. 5, and the seat carrying member 13 is shown in perspective view in Fig. 6. Figs. 3 to 6 clearly illustrate the above-described details. As may be seen from Figs. 4 and 5, and as is apparent from Fig. 1, the insert 11 has exterior teeth 20 which respectively cooperate with interior teeth 21 of the bearing member 5 for maintaining the insert 11 within the bearing member 5 in a predetermined angular position with respect to the substantially horizontal axis of the shaft portion 12. Thus, by setting the insert 11 into the hollow bearing member 5 at a predetermined angle, the position of the stationary stop members 15 will be determined, and thus the rest and operative positions of the seat carrying member 13 can be regulated. In this way it is possible to arrange a row of seats, so that they all extend substantially horizontally when they are in their operative positions. It will be noted from Fig. 6 that the seat carrying member 13 is of angle shape and therefore is provided with a downwardly extending flange which covers the hollow interior of the insert 11.

With the above-described structure of Figs. 1 to 6 it is possible to arrange a row of seats along any desired path while maintaining the seats readily movable between their rest and operative positions and while adjusting the operative position of the seats as well as the angular position of the seats with respect to each other, so that it is possible to compensate for any inaccuracies in the assembly.

Figure 7:
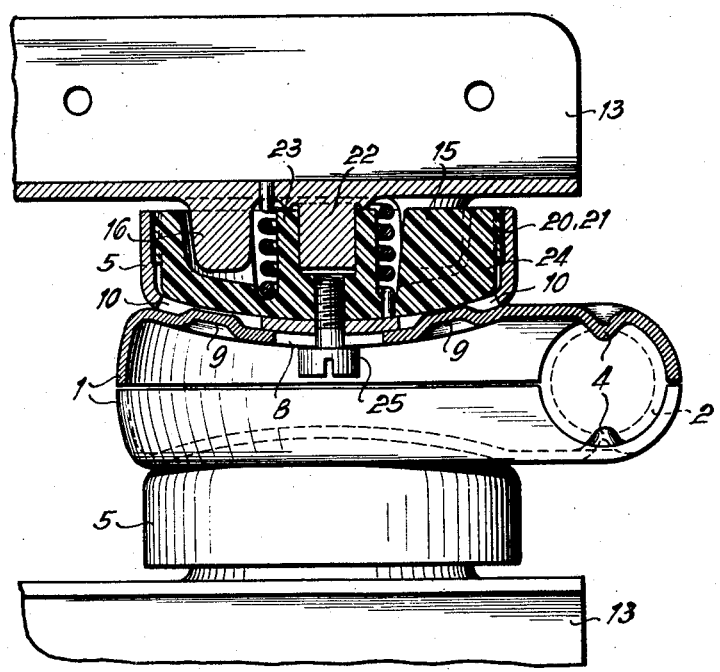
Fig. 7 is a partly sectional plan view of another embodiment of a device for supporting a pair of seats in side-by-side relation.

Another embodiment of the invention illustrated in Fig. 7 is identical with that of Figs. 1 to 6, except that instead of a shaft portion 12 fixed to the insert 11, the insert 24 of Fig. 7 which corresponds otherwise to the insert 11 is provided with a tubular portion 23 which receives a shaft portion 22 fixed to and extending from the seat carrying member 13, as shown in Fig. 7. Furthermore, in this embodiment of the invention the insert 24 and the bearing members 5 and 1 are fixed to each other by a screw 25 rather than a bolt 6 and a nut 7, this screw 25 extending through the central opening of the bearing member 5 into threaded engagement with threads located at an axial bore of the insert 24. The head of the screw 25 is wider than the cutout 8 except for a reduced portion of the head 25 located next to the shank of the bolt and slidable along the cutout 8, so that with the embodiment of Fig. 7 the same adjustments can be carried out as with the embodiment of Fig. 1.

The embodiment of the invention which is shown in

Figure 9:
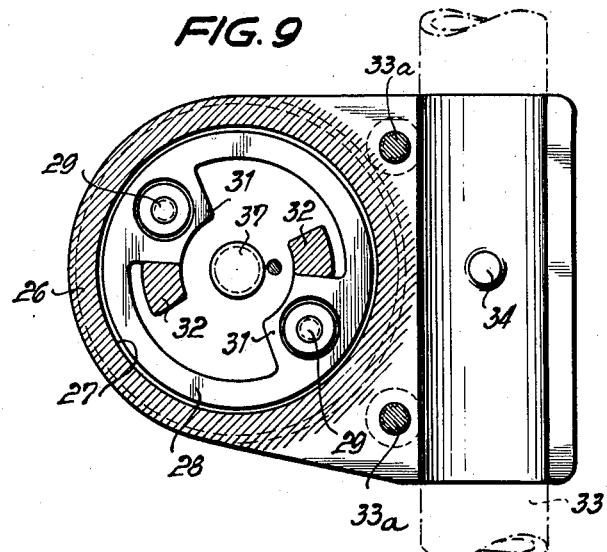
Fig. 9 is a partly sectional elevational view taken substantially along line IX—IX of Fig. 8 in the direction of the arrows.
Figure 8:
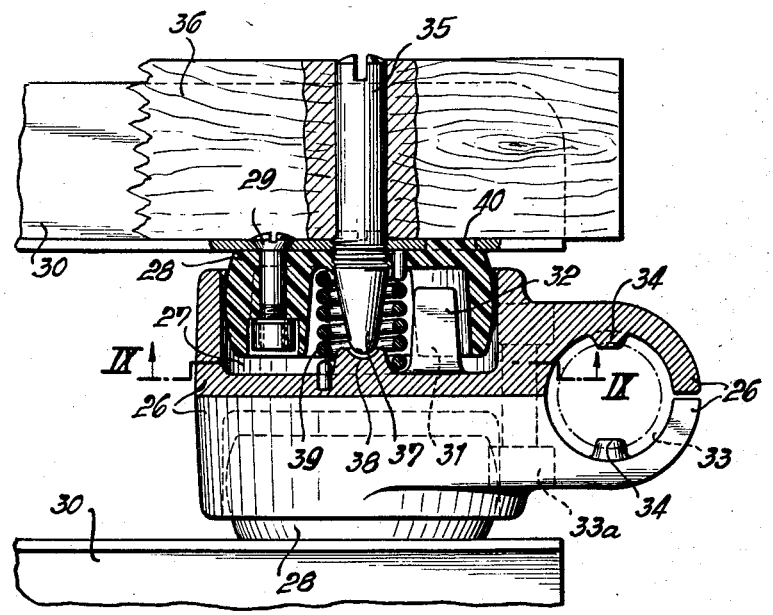
Fig. 8 is a partly sectional plan view of a third embodiment of a device for supporting a pair of seats in side-by-side relation.

Figs. 8 and 9 is characterized by its great simplicity. With this embodiment of the invention there are no shaft portions and tubular portions receiving the same.

As may be seen from Fig. 8, the stationary bearing means is in the form of stationary bearing members 26 formed of pressed or cast material such as metal. Each stationary bearing member 26 has a clamping portion, and these clamping portions embrace the bar 33 fixed to and extending upwardly from a floor or the like. The stationary bearing members 26 each have projections 34 extending through associated openings in the hollow bar 33. These stationary bearing members 26 are drawn together so as to be fastened to each other and to the bar 33 by the countersunk bolts 33a.

Each of the stationary bearing members 26 is formed with a recess 27 having a cylindrical side surface. Furthermore, substantially centrally within each recess 27, each bearing member 26 has a projection 38 provided with a concave end face which may form part of a sphere. A movable bearing member 28 made, for example, of a noise-reducing compressed material extends into the recess 27 and has an outer convex annular side surface cooperating with the cylindrical surface of the recess 27, as indicated in Fig. 8.

The outer convex side surface of the movable bearing member 28 preferably forms part of a sphere, so that the movable bearing member 28 is turnable in all directions with respect to the stationary bearing member 26. Screw members 29 fix the seat carrying member 30 to the bearing 28, and the latter has projections 40 extending into the openings of the seat carrying member 30, so that these projections relieve the screws 29 of shearing stresses. Fig. 8 shows a fragmentary part of a seat frame 36 fixed to the seat carrying member 30 which is in the form of an elongated angle iron. A screw member 35 extends through a bore of the frame member 36 and is threadedly connected to the bearing member 28 as well as to the seat carrying member 30, so that this screw member 35 may be turned by the operator without removing the seat frame 36, as is apparent from Fig. 8. The screw 35 terminates in a tapered rounded end portion 37 cooperating with the projection 38, in the manner shown in Fig. 8, so that the bearing member 28 and the member 30 therewith are capable of turning in all directions with respect to the stationary bearing member 26 while the screw 35 cooperates with projection 38 to limit the movement of the seat carrying member 30 and the movable bearing member 28 axially with respect to the stationary bearing member 26. As shown in dotted lines in Fig. 8, screw 35 may be shorter than the length shown in full lines. A spring 39 is coiled about the free end portion of the screw 35 and has its opposite ends respectively fixed to the stationary bearing member 26 and the movable bearing member 28, this spring 39 urging the seat carrying member 30 upwardly to a rest position.

A stop means is provided for limiting the angle of turning of the movable bearing 28 and the seat carrying member 30 therewith and this stop means includes the stop members 31 (Fig. 9) integral with the movable bearing member 28 and stop members 32 integral with the stationary bearing member 26, the cooperation between the stops 31 and 32 being readily apparent from Fig. 9. As may be seen from Fig. 9, the movable bearing member 28 may turn together with the stops 31 through somewhat less than 90° in a clockwise direction as viewed in Fig. 9 to move the seat to its rest position.

Figure 11:
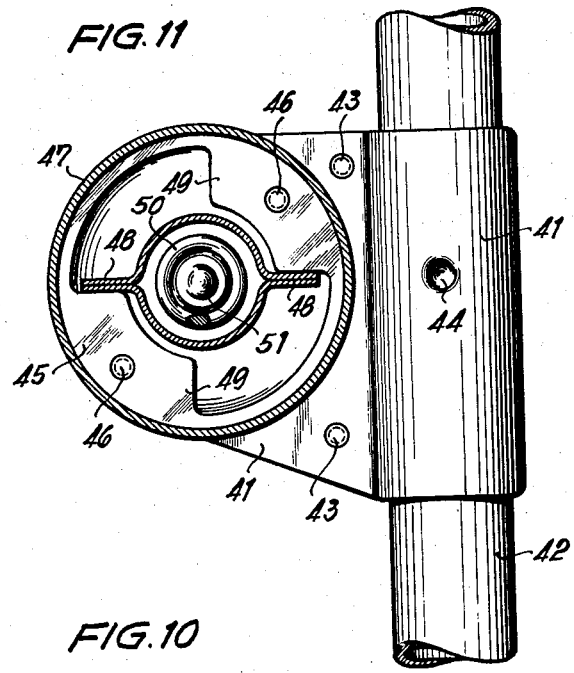
Fig. 11 is an elevational view of a part of the structure shown in Fig. 10, showing the details of a movable bearing member thereof.
Figure 10:
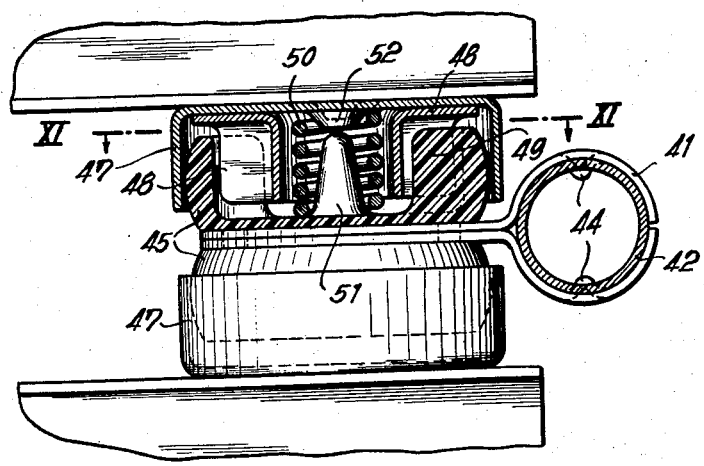
Fig. 10 is a partly sectional plan view of a further embodiment of a device according to the present invention.

In the embodiment of the invention shown in Figs. 10 and 11, the upwardly extending bar 42 is clamped by the clamp portions of a pair of plates 41 each having projections 44 extending into associated openings of the bar 42. The plates 41 are substantially coextensive with each other and have inner faces directed toward and engaging each other and outer faces directed away from each other. These outer faces of the plates 41 are respectively engaged by the stationary bearing members 45 which are each fixed to the plates 41 by screws 46 which additionally serve to fix the plates 41 to each other and to cause the plates 41 to tightly grip the bar 42. The stationary bearing members 45 each have an outer annular convex side surface forming part of a sphere, and movable bearing members 47 each fixed to the seat carrying members shown in Fig. 10 are in the form of hollow cylindrical members made of sheet steel or the like.

Each movable bearing member 47 has an inner cylindrical surface cooperating with the outer surface of the stationary bearing member 45 extending therein, so that in this way the bearing members 47 together with the seat carrying members fixed thereto are freely turnable in all directions.

In order to limit the axial movement of the movable bearing member 47, the latter is provided in its interior with a central projection 52 cooperating with and spaced slightly from the free end of a central projection 51 of the stationary bearing member 45, as shown in Fig. 10, so that elements 51 and 52 limit the axial movement of the movable bearing member 47. A spring 50 is coiled about projection 51 and has its opposite ends respectively fixed to the bearing members 45 and 47. This spring member 50 urges the bearing member 47 to turn about a substantially horizontal axis in order to locate the seat carrying member in its rest position.

In order to limit the angle of turn of the seat carrying member and movable bearing member 47 with respect to a substantially horizontal axis, the bearing member 45 is provided in its interior with integral stop portions 49 the configuration of which is most clearly shown in Fig. 11, while the movable bearing member 47 has fixed in its interior a pair of stop members 48 which respectively cooperate with the stop members 49 in the manner shown most clearly in Fig. 11.

It will be noted that the stop members 48 have intermediate arcuate portions which cooperate together to form a housing for the spring 50. The stop members 48 may also be made of sheet steel. As best shown in Fig. 11a, in order to be able to angularly adjust the position of the stop or detent members 49 relative to a horizontal axis, plate 41 may be provided with a plurality of closely spaced openings 46a, arranged along two arcs as shown, through which the fastening screws 46 may pass. Consequently, by selecting particular openings, the angular positions of the bearing member 45 and the stop members thereof may be adjusted, as desired, whereby to adjust the angle of turn of the seat. In lieu of this arrangement, the same result may be accomplished as in the embodiment of Fig. 1. More particularly, as shown in Figs. 10a and 10b, the movable bearing 47 may be provided along its inner surface with teeth 47a and an insert 48a may be provided therefor. The insert is provided on its outer surface with teeth 48b which engage teeth 47a, in the same manner as described in connection with the parts shown in Figs. 4 and 5.

The above-described embodiments of Figs. 8 to 11 provide the advantages of eliminating shaft portions and tubular portions for receiving the same and of completely enclosing the structure of the bearings. Furthermore, the parts are freely accessible, so that they may be adjusted easily to particular requirements.

Figure 12:
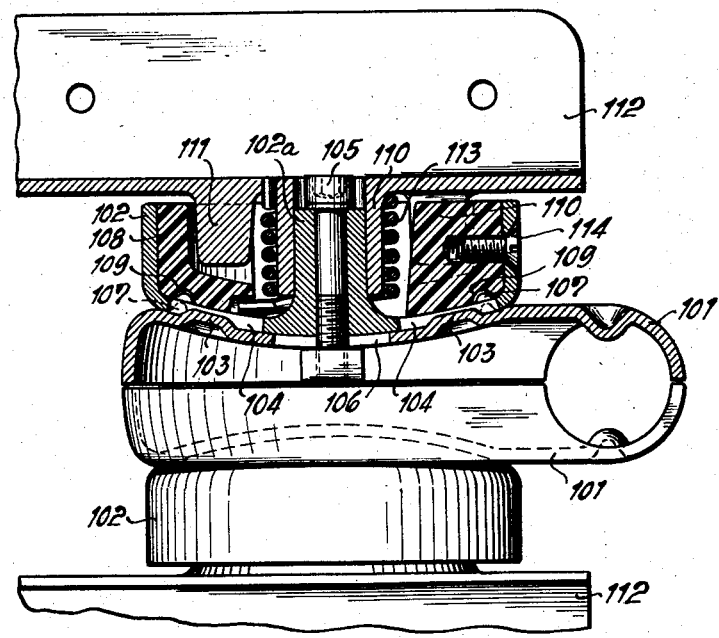
Fig. 12 is a partly sectional plan view of still another embodiment of a device according to the present invention.

The embodiment of Fig. 12 is similar to that of Fig. 1. Thus, the stationary bearing members 101 are fixed in the same way to the bar which extends upwardly from a floor. However, with the embodiment of Fig. 12 the movable bearing member 102 has integrally connected thereto the shaft portion 102a which corresponds to the shaft portion 12 of Fig. 1. This shaft portion 102a is axially bored to receive the screw 105 which cooperates with a nut identical with the nut 7 for fixing bearing members 101 and 102 to each other in an adjusted angular position with respect to a vertical axis, bulging portions 103 of the stationary bearing member 101 extending into elongated cutouts 104 for guiding the movable bearing member 102 for turning movement about a vertical axis, while preventing the bearing member 102 from turning about a horizontal axis, and, of course, the nut of Fig. 12 cooperates with an elongated cutout 106 corresponding to the cutout 8 of Fig. 1.

Figure 13:
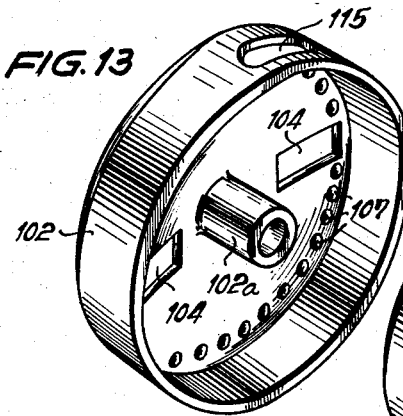
Fig. 13 is a perspective view of a movable bearing member shown in Fig. 12.

Thus, the screw 105 serves to fix the bearing members 102 and 101 to each other. The insert 108 of Fig. 12 corresponds to insert 11, and the insert 108 is fixed in the interior of the bearing member 102 by a screw 114 extending through an elongated slot 115 of the bearing member 102, this slot being shown most clearly in Fig. 13.

The seat carrying member 112 of Fig. 12 has a tubular portion 116 integral therewith and receiving the shaft portion 102a, so that the seat carrying member 112 is in this way connected to the bearing member 102 for turning movement about a substantially horizontal axis, and the coil spring 113 is coiled about tubular portion 116 and has its opposite ends respectively fixed to the seat carrying member 112 and the insert 108 for urging the seat carrying member 112 upwardly to its rest position.

Figure 14:
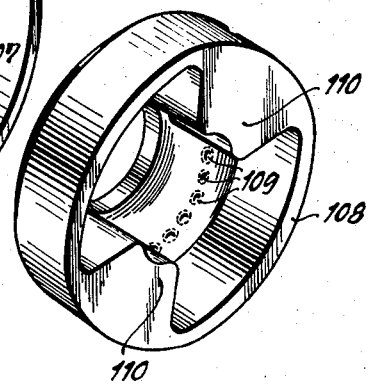
Fig. 14 is a perspective view of an insert of the embodiment shown in Fig. 12.

The angle of turning of the seat carrying member 112 about this horizontal axis is limited by the stop members 111 integrally fixed with the seat carrying member 112 and the stop members 110 integrally fixed with the insert 108. The configuration and position of the stop members 110 is shown most clearly in Fig. 14. A pair of opposite screw members 114 may extend through a pair of opposite slots 115 into threaded engagement with the insert 108 for fixing the latter to the movable bearing member 102.

In order to adjust the angular position of the stops 110 so as to be able to adjust the operating position of a seat carried by a seat carrying member 112, the movable bearing member 102 is provided with a circular row of projections 107 extending toward the interior of the movable bearing member 102 and being in the form of bulging portions of the member 102, for example, this member 102 being made, for example, of sheet steel.

These projections 107 are respectively adapted to enter a mating circular row of indentations 109 formed in the insert 108. Depending upon the interval between successive projections 107 and indentations 109, the interval between the angular adjustments will be regulated.

Figures 13A, 14A:
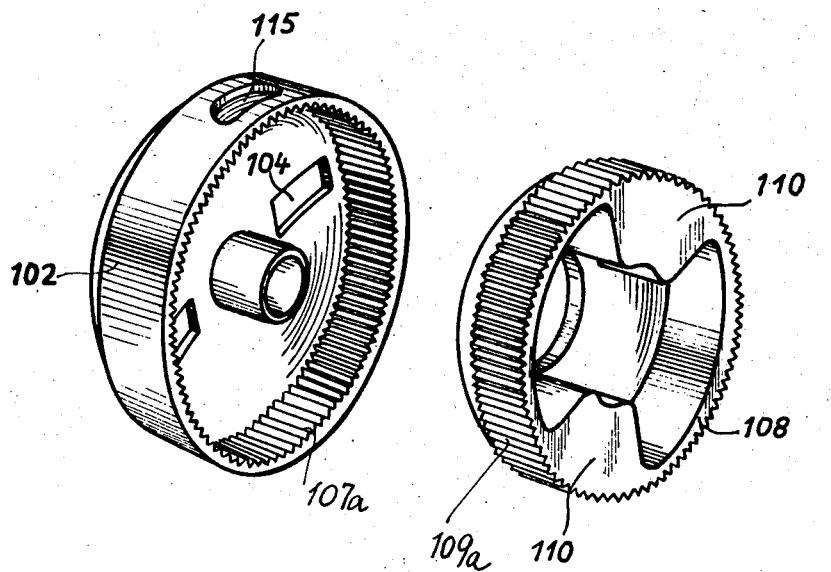
Fig. 13a is a view similar to Fig. 13 and illustrates a modification.
Fig. 14a is a view similar to Fig. 14 and illustrates a modification.

In lieu of the projections 107 and complementary indentations 109, adjustment of the angular position may be obtained by providing teeth 107a along the inner surface of movable bearing 102 and providing complementary teeth 109a along the outer surface of insert 108, as shown in Figs. 13a and 14a. Teeth 107a and 109a cooperate in the same manner, as described in connection with Figs. 4 and 5.

The slots 115 are elongated to permit the desired range of angular adjustment of the stops 110. It will be noted that the screws 105 are accessible, so that they may be loosened to admit the movable bearing member 102 to be turned about a substantially vertical axis with respect to the stationary bearing member 101 to a desired angular position, and then the screw 105 is tightened. In this way the angular positions of the seats with respect to each other about a vertical axis may be adjusted.

The insert 108 may be made of a softer material than the insert of Fig. 1 so as to increase the noise-reducing properties of the embodiment of Fig. 12.

Figs. 15 and 16 illustrate a variation of the embodiment of Figs. 10 and 11 which enables the stop means to be angularly adjusted with respect to a substantially horizontal axis, so that the turning angle of the seats can be angularly adjusted.

Fig. 17 shows an elevation of an entire bearing assembly of Figs. 15 and 16, the bearing assembly of Fig. 17 forming the end of a row of these bearing assemblies.

Referring to Figs. 15 to 17, it will be seen that the structure is carried by an upwardly extending tubular bar 117 to which the plates 118 are fixed in the same way as in the embodiment of Figs. 10 and 11. Plates 119 are respectively fixed to the outer faces of the plates 118 as by being spot welded thereto, for example. These plates 119 are each provided with a circular row of projections 120 formed, for example, by bulging portions of plates 119. The projections 120 instead of taking the form of bulging portions may, if desired, take the form of small keys arranged radially with respect to the center of the plate 119. Although the plates 119 could be eliminated and the projections 120 formed directly in the plates 118, it is far simpler and less expensive to provide the projections 120 on a separate plate 119 and then to fix the latter to a plate 118. The projections 120 cooperate with a circular row of recesses 121 formed in the stationary bearing member 122 which corresponds to the stationary bearing member 45 of Fig. 10. Thus, it is possible to place the stationary bearing member 122 on a plate 119 in a predetermined adjusted angular position, and the intervals between these angular positions are determined by intervals between the projections 120 and the recesses 121.

Screw members 123 serve to fix the pair of opposite stationary bearing members 122 to the plates 119, and the latter as well as the plates 118 are formed with the arcuate slots 124 (Fig. 16) through which the screw members 123 pass, so that these arcuate slots permit the stationary bearing members 122 to be turned through the desired angular range. The angular adjustments of the stationary bearing members 122 serve to angularly position the stop members 125 fixed to the stationary bearing members 122 and corresponding to the stop members 49 of Figs. 10 and 11. Otherwise the structure of Figs. 15 to 17 is identical with that of Figs. 10 and 11, the stop members 126 of Figs. 15 to 17 corresponding to the stop members 43 of Figs. 10 and 11, the projections 129 and 130 of Figs. 15 to 17 corresponding respectively to the projections 52 and 51 of Figs. 10 and 11, and the spring 128 of Figs. 15 to 17 corresponding to the spring 50 of Figs. 10 and 11.

Fig. 17 shows a cap member 131 placed upon an end bearing assembly of a row of these assemblies so as to cover the end bearing assembly, and the cap 131 covers the entire bearing up to the seat. As is evident from Fig. 17, the cap 131 may be provided with a number indicating the number of a row, row number "14" being indicated in Fig. 17.

With reference to Fig. 12, the feature of making the shaft portion 102a integral with the movable bearing member 102 has the advantage of making this shaft portion of the same metal as the bearing member 102, so that there is no danger of breakage of the shaft portion as might be the case with a non-metallic shaft portion. Moreover, with the embodiment of Fig. 12 it is still possible to make the insert 108 of a yieldable material, so that the stop means can operate at a greatly reduced noise level.

It will thus be seen that the invention provides in a seat mounting device, a bar adapted to extend upwardly from a floor, a seat carrying member located adjacent the bar, stationary bearing means fixed to the bar, and movable bearing means fixed to the seat carrying member, the stationary and movable bearing means cooperating with each other to connect the seat carrying member to the bar and to support the seat carrying member for turning movement about substantially vertical and horizontal axes.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. In a seat mounting device, a bar adapted to extend upwardly from a floor, a pair of seat carrying members spaced from each other and located adjacent said bar, a pair of stationary bearing members fixed to each other and clamped on said bar, said bearing members respectively having outwardly directed concave bearing faces which are directed away from each other, a pair of movable bearing members respectively having convex faces mating with and respectively engaging said concave faces of said stationary bearing members, means cooperating with each pair of stationary and movable bearing members for guiding said movable bearing members respectively for turning movement about substantially vertical axes with respect to said stationary bearing members, said movable bearing members being hollow and respectively having open ends respectively directed away from said stationary bearing members and toward said seat carrying members, a pair of inserts respectively located in said movable bearing members, means cooperating with each movable bearing member and the insert therein for adjusting the angular position of each insert with respect to a substantially horizontal axis, means connecting said seat carrying members respectively to said inserts for turning movement with respect to the latter about substantially horizontal axes, respectively, means releasably fixing said inserts and movable bearing members to each other and respectively to said stationary bearing members in given angular positions with respect to substantially vertical axes, respectively, spring means cooperating with each insert and the seat carrying member connected thereto for urging said seat carrying member to a rest position, and stop means fixed in part to said inserts and to said seat carrying members for limiting the turning movement of the latter between said rest positions thereof and operating positions, respectively, whereby the angular adjustment of said inserts with respect to said horizontal axes angularly positions said stop means to determine the angle of turning of said seat members.

2. In a device according to claim 1, said means for adjusting the angular position of said inserts with respect to a horizontal axis, comprising teeth at the interior of said movable bearing members and teeth at the exterior of said inserts respectively cooperating with said teeth of said movable bearing members.

3. In a device according to claim 1, said means connecting said seat members respectively to said inserts comprising shaft portions integral with said inserts and tubular portions fixed to said seat carrying members and respectively receiving said shaft portions.

4. In a device according to claim 3, said means fixing said inserts and movable bearing members to each other and respectively to said stationary bearing members comprising bolts extending through said shaft portions, respectively, into said stationary bearing members and nuts located at said stationary bearing means and respectively cooperating with said bolts.

5. In a device according to claim 1, said means respectively connecting said seat members to said inserts comprising shaft portions respectively fixed to and extending from said seat members and tubular portions respectively fixed to said inserts and respectively receiving said shaft portions.

6. In a seat mounting device for mounting a pair of seats in side-by-side relation; a bar adapted to extend upwardly from a floor, a pair of stationary bearing members fixed to each other and to said bar, said bearing members respectively being formed with identical recesses directed away from each other, said recesses respectively having identical coaxial cylindrical surfaces, a pair of movable bearing members respectively extending into said recesses and respectively having outer faces respectively forming parts of spheres and respectively cooperating with said cylindrical surfaces to connect said movable bearing members respectively to said stationary bearing members for turning movement in all directions with respect to said stationary bearing members, a pair of seat carrying members respectively fixed to said movable bearing members for turning movement therewith, adjustable means cooperating with said movable and stationary bearing members for limiting the extent to which said movable bearing members may enter into said recesses of said stationary bearing members, spring means respectively cooperating with said stationary and movable bearing members for urging said movable bearing members and said seat carrying members therewith respectively for turning movement about substantially horizontal axes to a rest position, and stop means cooperating with said movable and stationary bearing members for limiting the angles through which said movable bearing members and seat carrying members therewith may turn about substantially horizontal axes, respectively.

7. In a device for mounting a pair of seats in side-by-side relation; a bar adapted to extend upwardly from a floor, a pair of coextensive plates fixed to each other and to said bar, said plates having inner faces directed toward and engaging each other and outer faces directed away from each other, a pair of stationary bearing members respectively fixed to said outer faces of said plates and respectively having convex outer side surfaces which respectively form parts of a pair of spheres, a pair of hollow cylindrical movable bearing members respectively cooperating with said stationary bearing members and respectively having inner cylindrical surfaces respectively cooperating with said outer side surfaces of said stationary bearing members for supporting said movable bearing members on said stationary bearing members for turning movement in all directions with respect thereto, respectively, a pair of seat carrying members respectively fixed to said movable bearing members, stop means fixed to said movable and stationary bearing members for limiting the turning of said movable bearing members and seat carrying members therewith about substantially horizontal axes, respectively, spring means cooperating with each pair of movable and stationary bearing members for urging said movable bearing members and said seat members therewith to a rest position, and means cooperating with each pair of movable and stationary bearing members for limiting the axial movement of said movable bearing members toward each other and onto said stationary bearing members, respectively.

8. In a seat mounting device for mounting a pair of seats in side-by-side relation; a bar adapted to extend upwardly from a floor, a pair of stationary bearing members fixed to each other and to said bar and respectively having outer concave bearing surfaces directed away from each other, a pair of movable bearing members respectively having convex bearing surfaces mating with and respectively engaging said concave bearing surfaces, said movable bearing members being hollow and respectively having in their interiors central shaft portions extending substantially horizontally away from said stationary bearing members, respectively, a pair of annular inserts fixed in predetermined angular positions about said shaft portions, respectively, in the interior of said movable bearing members respectively to the latter, a pair of seat carrying members respectively having tubular portions fixed thereto and respectively receiving said shaft portions, so that said seat carrying members are respectively turnable with respect to said movable bearing members respectively about said shaft portions, spring means operatively connected to each seat member for urging the same to turn about the shaft portion cooperating therewith to a rest position, and stop means fixed to said inserts and seat carrying members for limiting the angles through which the latter turn, respectively.

9. In a device according to claim 7, means for adjusting the angular positions of said stationary bearing members with respect to a substantially horizontal axis, so as to adjust said stop means to thereby adjust the angle of turning of said movable bearing members and said seat carrying members therewith about said horizontal axis.

10. In a device according to claim 1, a cap covering said stationary bearing means when the seat mounting device is the last of a row of said devices.

11. A seat mounting device comprising stationary bearing means connected to a support, a seat carrying member, movable bearing beans secured to said member, said stationary bearing means and said movable bearing means cooperating with each other to connect said member to said support and to mount said member for turning movement about a substantially horizontal axis upwardly to a rest position and downwardly to an operative position, and stop means on said member, said movable bearing means including an insert, said insert having stop members engageable with said stop means of said member for defining said rest and operative positions of said member and for determining the angle through which said member turns during movement between said positions.

12. A seat mounting device comprising stationary bearing means connected to a support, a seat carrying member, movable bearing means secured to said member, said stationary bearing means and said movable bearing means cooperating with each other to connect said member to said support and to mount said member for turning movement about a substantially horizontal axis upwardly to a rest position and downwardly to an operative position, stop means on said member, said movable bearing means including an insert, said insert having stop members engageable with said stop means of said member for defining said rest and operative positions of said member and for determining the angle through which said member turns during movement between said positions, and spring means operatively connected to said stationary and movable bearing means for urging said seat member to said rest position.

13. A seat mounting device comprising stationary bearing means connected to a support, a seat carrying member, movable bearing means secured to said member, said stationary bearing means and said movable bearing means cooperating with each other to connect said member to said support and to mount said member for turning movement about a substantially horizontal axis upwardly to a rest position and downwardly to an operative position, stop means on said member, said movable bearing means including an insert, said insert having stop members engageable with said stop means of said member for defining said rest and operative positions of said member and for determining the angle through which said member turns during movement between said positions, said stationary bearing means including a pair of clamp portions clamping said support, said support being a hollow bar and being provided in opposite wall portions thereof with a pair of openings, said clamp portions having projections respectively extending into said openings to hold said stationary bearing means against rotation about said bar.

14. A seat mounting device as set forth in claim 6, wherein said adjustable means comprises a projection extending in a direction outwardly of each recess, each projection having a concave end face, a screw member threadedly engaged with each seat carrying member and the associated movable bearing member, each screw member terminating in a tapered rounded end complementary to the associated projection end face and cooperating therewith.

15. A seat mounting device as set forth in claim 6, wherein said adjustable means comprises a projection extending in a direction outwardly of each recess, each projection having a concave end face, a screw member threadedly engaged with each seat carrying member and the associated movable bearing member, each screw member terminating in a tapered rounded end complementary to the associated projection end face and cooperating therewith, a seat frame secured to each seat carrying member, each seat frame having a bore provided therein through which an associated screw member extends for access outwardly of the seat frame.

16. A seat mounting device as set forth in claim 6, wherein each seat carrying member is fixed to the associated movable bearing member by screw members and by projections provided on each movable bearing member which extend into complementary recesses provided in the associated seat carrying member.

17. A seat mounting device as set forth in claim 7, wherein said cooperating means comprises a central projection provided on each movable bearing member which extends toward the associated stationary bearing member, and a central projection provided on each stationary bearing member which extends toward the projection on the associated movable bearing member.

18. In a device according to claim 7, means for adjusting the angular positions of said stationary bearing members with respect to a substantially horizontal axis, so as to adjust said stop means to thereby adjust the angle of turning of said movable bearing members and said seat carrying members therewith about said horizontal axis, said angular position adjusting means comprising a plurality of relatively closely spaced openings provided in said plates, said openings being adapted for selectively receiving securing screws.

19. In a device according to claim 7, means for adjusting the angular positions of said stationary bearing members with respect to a substantially horizontal axis, so as to adjust said stop means to thereby adjust the angle of turning of said movable bearing members and said seat carrying members therewith about said horizontal axis, said angular position adjusting means comprising teeth defined along the inner side surface of each stationary bearing member and an insert provided in each stationary bearing member, said insert having teeth defined along its outer side surface for engagement with the teeth of the associated stationary bearing member, and the stop means of each stationary bearing member being provided on its associated insert.

References Cited in the file of this patent

UNITED STATES PATENTS

| | | |
|---|---|---|
| 1,262,596 | Bishop | Apr. 9, 1918 |
| 1,810,888 | Hanson | June 16, 1931 |
| 2,272,298 | Hanson | Feb. 10, 1942 |
| 2,312,638 | Gedris | Mar. 2, 1943 |
| 2,500,135 | Nordmark | Mar. 7, 1950 |
| 2,643,706 | Brown | June 30, 1953 |

FOREIGN PATENTS

| | | |
|---|---|---|
| 235,586 | Great Britain | Mar. 11, 1926 |
| 802,759 | Germany | Feb. 22, 1951 |